United States Patent [19]

Streuli

[11] Patent Number: 4,719,756

[45] Date of Patent: Jan. 19, 1988

[54] SUPERCHARGED MARINE DIESEL ENGINE

[75] Inventor: Adrian Streuli, Schinznach-Bad, Switzerland

[73] Assignee: BBC Brown, Boveri & Company, Limited, Baden, Switzerland

[21] Appl. No.: 850,561

[22] Filed: Apr. 11, 1986

[30] Foreign Application Priority Data

Apr. 25, 1985 [CH] Switzerland .................. 1764/85

[51] Int. Cl.$^4$ .................................... F02C 5/00
[52] U.S. Cl. ................................ 60/597; 60/624
[58] Field of Search ............... 60/597, 598, 605, 624; 290/52

[56] References Cited

U.S. PATENT DOCUMENTS 2,625,006  1/1953  Lundquist .................. 60/624 X

FOREIGN PATENT DOCUMENTS 2001390  3/1983  German Democratic Rep. ... 290/52
   3638  1/1979  Japan ............................ 60/624
 457813  2/1975  U.S.S.R. ........................ 60/624

Primary Examiner—Michael Koczo
Attorney, Agent, or Firm—Burns, Doane, Swecker & Mathis

[57] ABSTRACT

A supercharged marine diesel engine having at least one exhaust gas turbocharger and a separate power turbine is connected in parallel with the supercharger turbine. At least one auxiliary diesel engine drives a synchronous generator for supplying the shipboard grid with electrical energy. The power turbine is connected to a free shaft end of the auxiliary diesel/generator unit. By this arrangement, it is possible to reduce the load on the auxiliary diesel engine, which results in a substantial saving in fuel.

2 Claims, 1 Drawing Figure

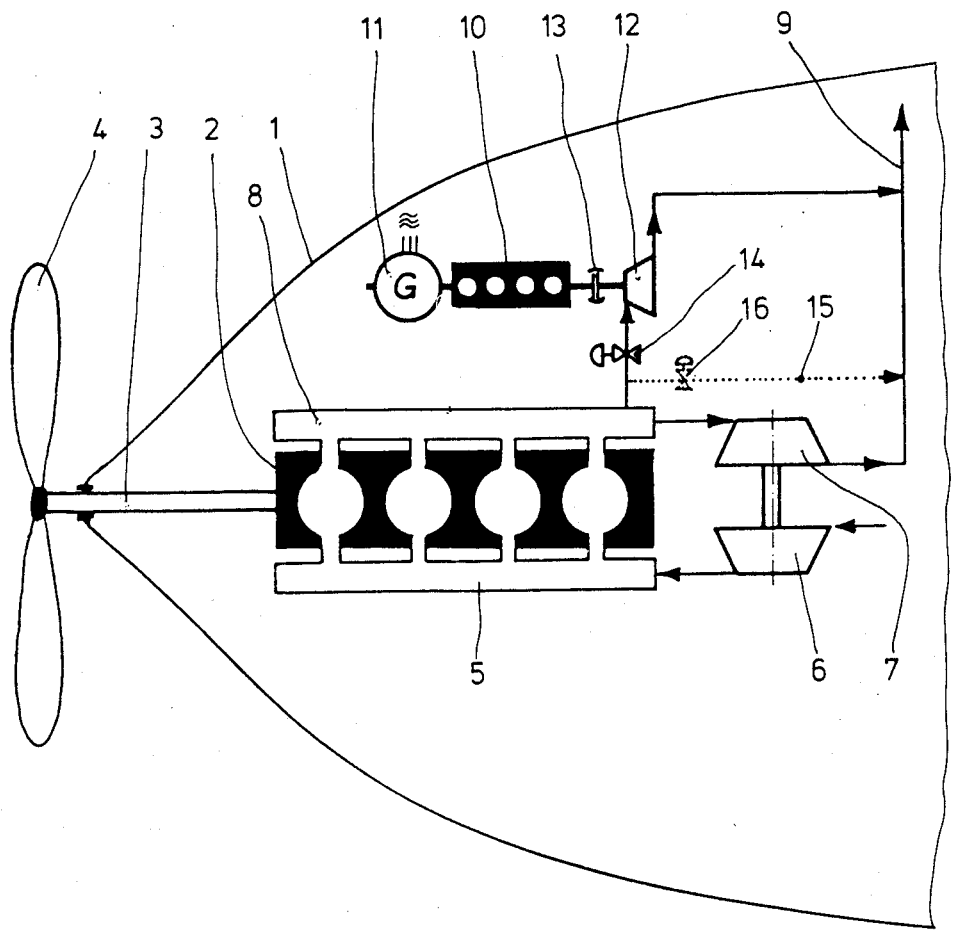

SUPERCHARGED MARINE DIESEL ENGINE

FIELD OF THE INVENTION

The invention relates to supercharged marine diesel engines and shipboard electric systems utilizing synchronous generators driven by diesel engines.

BACKGROUND AND SUMMARY OF THE INVENTION

Marine diesel engines of this type, in which the power turbine is used for generating the necessary shipboard electrical energy, are known.

Thus, for example, a generator can be directly coupled to the reduction gear of the high speed power turbine. A unit of this type has the advantage that it can be accommodated wherever space is freely available in the ship's engine room, with the condition that the gas ducts should not be too long. The disadvantage of this solution is the requirement for expensive power electronics to control the turbine/generator unit to a specified rotational speed. Electronic controls of this type cost a multiple of the turbine and price causes them to be excluded from the short list of possibilities for overcoming the above disadvantage. The obvious employment of economical asynchronous generators is also excluded because, in contrast to stationary installations where the electrical grid (which is generally large) keeps the turbine/generator unit at constant rotational speed, the total shipboard power in the case of marine installations is approximately of the same order of magnitude as that of the power turbine. The shipboard grid is, therefore, incapable of keeping the rotational speed of a power turbine/asynchronous generator unit constant.

Another possible speed control system, in which a synchronous generator is coupled to the power turbine and this unit is controlled by means of butterfly valves located in the exhaust gas, cannot be used either. The factors paeticularly opposing the use of this arrangement are the expensive arrangement of controllable butterfly valves in the exhaust gas flow of installations fired with heavy oil and the difficulty of calculating dynamic processes in the long exhaust gas ducts.

Another way of employing the power turbine for generating electricity is possible in the case of marine diesel engines which themselves drive a speed-controlled generator. In this case, the power turbine can be coupled to the free end of the shaft of the generator. Because of the expensive speed control, however, a large number of marine engines are not equipped with their own generator. Generally speaking, provision is made for the output of the power turbine to be supplied to the crankshaft of the main engine via a gear, which is also an expensive solution.

The object of the invention is therefore to use the power turbine for at least partially covering the electricity requirements of a marine installation of the type discussed above and to do this in a simple, economical and reliable manner.

According to the invention, this is achieved by the power turine being coupled to a free shaft end of the auxiliary diesel/generator unit.

The advantages of this arrangement are clear. All the additional generators, gears and controls mentioned above can be avoided. Without any change to the concept and without design effort, existing installations can be retrofitted or converted in the shortest possible time with the new arrangement. On this point, it should be mentioned that, at the time the invention of the present application was made, power turbines associated with supercharged marine diesel engines are not yet in operation and that, therefore, the abovementioned known solutions together with their shortcomings are of a theoretical nature.

BRIEF DESCRIPTION OF THE DRAWING

One illustrative example of the invention is shown diagrammatically in the drawing. In this, the flow directions of the working media are indicated by arrows.

DETAILED DESCRIPTION OF THE INVENTION

The greatly simplified marine installation, in which the elements unimportant to the invention are omitted, shows a multi-cylinder marine diesel engine, subsequently referred to as the main diesel 2, within a hull 1. The fixed propeller 4 is directly driven via a shaft 3. The supercharged engine receives compressed air from the air receiver 5, into which the air is pumped by the compressor 6 of an exhaust gas turbocharger. The compressor drive is provided by the supercharger turbine 7, which is driven by the exhaust gases from the common exhaust duct 8 of the main diesel 2. After expansion, the exhaust gases are exhausted to atmosphere via the exhaust 9 and a funnel (not shown).

A multi-cylinder auxiliary diesel 10 is provided for the provision of the shipboard electrical power, this auxiliary diesel driving a synchronous generator 11. For this purpose, the speed of the auxiliary diesel is controlled, to 1200 r.p.m., for example.

The surplus exhaust gas energy from the main diesel 2 is fed to a power turbine 12. In terms of flow, this power turbine is connected in parallel with the supercharger turbine 7, i.e. it is also driven by hot exhaust gases from the common exhaust duct 8.

This power turbine 12, like the auxiliary diesel 10, is also used for the generation of electrical energy. In contrast to the known solutions, in which the power turbine either drives its own generator or is connected to the generator driven by the main diesel, the power turbine in the present case is connected to a free shaft end of the auxiliary diesel/synchronous generator functional unit. In the present example, this takes place via a free wheel coupling 13 on the engine side. It is obvious that the connection could be equally well made on the generator side. Other types of coupling such as a tooth coupling, a rubber coupling, a fluid coupling or the like can, of course, be used.

The power turbine can be switched off by means of an exhaust gas butterfly valve 14. The fact that the power turbine can be put out of operation is of particular importance in the case of exhaust gas turbochargers whose supercharger turbine 7 is designed for part load. This part load design is effected in such a way that the pressure in the common exhaust duct 8 is increased. In the case of 2-stroke engines and scavenged 4-stroke engines, this can take place up to a value at which sufficient scavenging is still guaranteed; this can be almost as far as the region of the supercharge pressure. Increased pressure in the common exhaust gas duct 8 is achieved by reducing the turbine cross-section admitting the exhaust gases from 100% (for full load design) to 80%. This increased pressure has the result that a larger part of the potential exhaust gas energy can be utilized because throttling losses which would otherwise occur between the cylinder and the collecting vessel, can also be reduced. In order to achieve the supercharged pressure mentioned i.e. in order to produce the necessary compressor performance, the supercharger turbine 7 no longer requires the full energy supply otherwise available. The part which is not required is processed in the power turbine 12.

With the parallel connection of the power turbine shown, the total turbine area subject to gas admission can, in such a case, be subdivided as follows: 70% of the area is provided by the supercharger turbine 7 and 10% by the power turbine 12.

By this arrangement, it is possible, with the main diesel 2 on full load—to achieve an improvement in consumption, i.e. a saving in fuel of about 3%, despite a slight reduction in the power density, i.e. a 1 to 2% reduction in the mean specific pressure. Neither the thermal nor the mechanical loads on the main diesel become worse relative to a full load design (100% turbine area).

Switching off the power turbine at part load, as mentioned, leads to a 30% reduction in turbine area relative to the conventional 100% case and to a reduction of about 10% relative to the case of a power turbine which cannot be switched off. This produces a further increase in the pressure in the common exhaust gas duct 8 and, consequently, a substantial increase in the supercharge pressure in the air receiver 5. The result is that the specific fuel consumption is further improved in the part load range.

A blow-down duct 15 provided with an emergency butterfly valve 16 is located between the power turbine inlet flow duct and the exhaust 9 in order to deal with the case where the power turbine has to be put out of operation for other reasons, i.e. the exhaust gas butterfly valve 14 is closed. The minimum cross-section of the blow-down duct 15 is dimensioned to correspond with the turbine area of the power turbines 12. This ensures that the supercharger turbine 7 only has to process the gas quantity for which it is designed even under emergency operating conditions.

The power turbine 12 is a relatively small, high-speed turbine. The r.p.m., which may for example be 23,000, must therefore be reduced by a gear to the necessary 1,200 r.p.m., which corresponds to the generation of 60 Hz. The lubricant circuit of the auxiliary diesel 10 can be used for lubricating the power turbine 12 and the gear.

The invention is explained using a realistic numerical example. It is obvious that only approximate values are given because an excessive number of parameters specific to the engine and the supercharger would dilute the conclusions possible from absolute values.

The following example concerns a single engine installation in a container ship with a direct propeller drive. The large 2-stoke diesel used has 12 cylinders and a drive power of about 35,000 kW.

The electrical energy requirements of such a ship are, on average, 1,200 kW. The auxiliary installation feeding the shipboard electrical grid consists of three auxiliary diesel engines each coupled to a 1,600 kW generator. Of these with one auxiliary diesel is under power (in order to cover the load currently demanded), a second auxiliary diesel runs at idle and the third auxiliary diesel is provided as a reserve.

Three exhaust gas turbochargers provide the supercharge air. An isentropic compressor power of 8,000 kW is necessary for a pressure of about 3.2 bar in the air receiver. At a compressor efficiency of 85%, approximately 9,500 kW are supplied to the three turbocharger shafts.

The power available from the exhaust gases at present day efficiencies, however, is approximately 10,500 kW at a pressure of 3.0 bar. The surplus exhaust gas energy is utilized in the power turbine so that about 1,000 kW is given up by its shaft to the auxiliary diesel/generator functional unit.

The auxiliary engine therefore only has to generate 200 kW of the required 1,200 kW shipboard power—which leads to a substantial economy in fuel. Compared with those solutions in which the same power turbine power is given up to a generator coupled to the main diesel, there are even greater quantitative savings in the present case because, in the first place, the specific fuel consumption of the auxiliary diesel is greater than that of the main diesel and, in the second place, the auxiliary diesel is generally operated on more expensive fuel than the main diesel.

This example shows that one power turbine is sufficient even in the case of the largest installations. Thus in an emergency—even during full load operation—it is quite possible (after closing the exhaust gas butterfly valve 14 and opening the emergency butterfly valve 16) to disconnect the power turbine from a first auxiliary diesel and to couple it to a second auxiliary diesel.

The invention is not, of course, limited to the embodiment example shown and described. Thus it is quite possible to use several power turbines. In this case, it may be desirable to select various type sizes, the power turbines having different turbine areas. This would provide the possibility of operating the individual power turbines separately and in steps depending on the power demanded.

As a variation on the single-engined installation shown, it would also be quite possible, in the case of multi-engined installations with medium speed 4-stroke diesel engines, to provide either a single power turbine, one power turbine per engine or several power turbines per engine.

What is claimed is:

1. A marine power system comprising a main engine having an exhaust duct with parallel branches, an exhaust gas turbocharger in one of said branches and a separate power turbine in another of said branches, an auxiliary diesel engine, a synchronous generator, and a common shaft connected between said auxiliary diesel engine and said synchronous generator and to said power turbine for driving said generator for supplying electrical power for a shipboard grid.

2. The marine power system according to claim 1 including a free wheel coupling between said shaft and said power turbine.

* * * * *